Feb. 22, 1944.  F. E. FISCHER  2,342,133
ELECTRIC MOTOR
Filed Jan. 24, 1940  4 Sheets-Sheet 1

INVENTOR
F. E. FISCHER

Feb. 22, 1944.   F. E. FISCHER   2,342,133
ELECTRIC MOTOR
Filed Jan. 24, 1940   4 Sheets-Sheet 2
FIG. 3
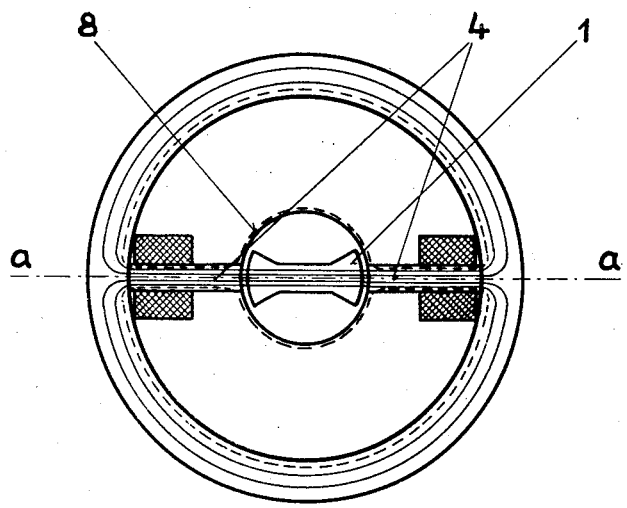
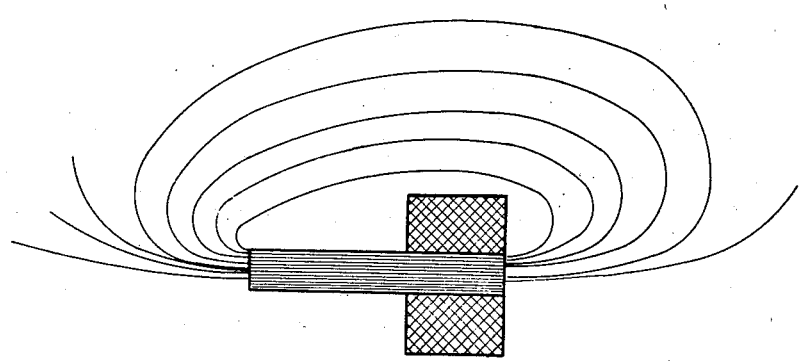
FIG. 4
INVENTOR
F.E.FISCHER
BY
ATTORNEYS Feb. 22, 1944.  F. E. FISCHER  2,342,133
ELECTRIC MOTOR
Filed Jan. 24, 1940  4 Sheets-Sheet 4

F. E. FISCHER
INVENTOR
BY Lackenbach & Hirschman
ATTORNEYS

Patented Feb. 22, 1944

2,342,133

UNITED STATES PATENT OFFICE 2,342,133

ELECTRIC MOTOR

Friedrich Ernst Fischer, Zurich-Erlenbach, Switzerland

Application January 24, 1940, Serial No. 315,325
In Switzerland February 6, 1939

8 Claims. (Cl. 172—275)

This invention relates to electric motors and has for its chief object the provision of an improved motor, more particularly of the polyphase reaction synchronous type, the moving parts of which have a small amount of inertia in proportion to the power output. The invention is particularly concerned with the construction and the shaping of the stator and of the rotor, as well as with the arrangement of the windings.

In the present-day construction of electric motors it is usual to use laminated iron plates for building up the stator, these plates being superimposed to form the stator core with their planes perpendicular to the axis of the rotor.

This permits the plates to be stamped with a uniform shape and enables them to be assembled in the easiest possible manner to form a compact unit.

In the motor according to the present invention, however, at least part of the stator is formed of superimposed plates, the planes of which are parallel to the axis of the rotor. It has been found that by utilising this construction important technical advantages can be obtained as compared with motors of known construction. More particularly, it is possible to obtain a relatively high rotor torque with a very small moment of inertia, which is particularly advantageous in the case of motors used as the controlled motors in electrical remote control systems.

With the plates arranged with their planes parallel to the rotor axis, they must be arranged in a spoke-like manner with respect to this axis, with the result that gaps are formed between the individual plates—or between assemblies of plates if several plates are clamped together and these gaps are wider towards the circumference of the stator.

According to a further feature of the invention, these gaps are used to receive the stator windings which serve to generate the magnetic flux.

In order that the said invention may be clearly understood and readily carried into effect, the same will now be more fully described, by way of example, with reference to the accompanying drawings in which—

Figure 3 shows the paths of the magnetic flux in the stator;

Figure 4 shows the lines of force when the plates of the stator are superimposed in a longitudinal direction;

Figure 1:
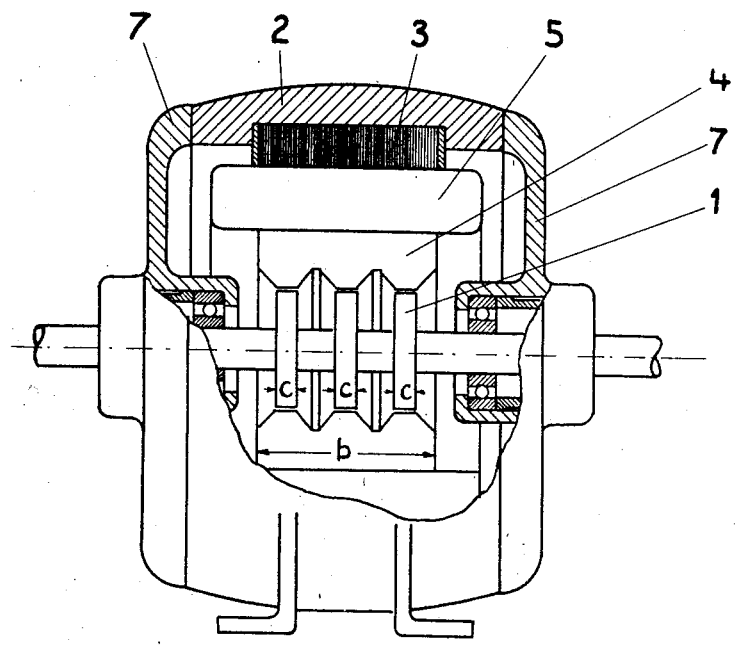
Fig. 1 is a partial longitudinal section of a motor according to the invention.

As is known, the torque of an electric motor available at the rotor shaft (the rotor being of the unwound type) is proportional to the magnetic energy in the air gap, and this depends, inter alia, on the amper-turns of the stator winding. For the generation of the flux necessary to give a maximum torque a winding is required which takes up a comparatively large amount of space and which must consequently be arranged at the periphery of the stator. The result of this is that the diameter of the stator naturally becomes rather large.

On the other hand, the follower efficiency of a motor, i. e., the progressive rotation of the rotor corresponding to the changing direction of the flux, which is particularly important in the case of the controlled motor of an electrical remote control system, is dependent upon the moment of inertia of the rotor for a given magnitude of flux. This moment of inertia must be kept as small as possible in order to obtain high follower sensitivity and this naturally involves rotors of small diameter.

With a motor having a very large torque and a very small moment of inertia of the moving parts, the necessary ampere-turns cannot generally be provided with the usual winding arrangement on account of the small inner diameter of the stator, while an increase in the air gap between the stator and the rotor is to be avoided at all costs on account of the reduction in the magnetic energy in the air gap which would be caused. The problem consequently arises of conveying to the rotor, as far as possible without loss, the magneto-motive force which is generated by the stator winding at a comparatively large distance from the rotor. This problem is solved by the construction and arrangement of the motor according to the invention, the results being particularly favourable when the flux is conducted from the stator winding, which generates it, to the rotor through laminated plates, the laminations of which are parallel to the rotor axis.

The construction of a motor according to the invention will first be explained in principle with reference to Figures 1 and 2 of the drawings. In these figures, 1 is the rotor shaft with the rotor, 2 is the stator housing, 3 is the yoke of the magnetic structure of the stator, 4 are the assemblies or groups of clamped plates which are arranged with their planes parallel to the rotor axis 1, said plates completing the magnetic structure of the stator and constituting the poles, 5 is the winding of the stator, 6 are insulators which also serve as distance pieces or spacers for the plate assemblies 4, and 7 is the bearing cover with the bearings for the rotor shaft 1.

If, to consider an example, there is generated in the stator assembly or group which is shown in Figures 3 and 4, and which is surrounded by a winding through which a current is passed, a magnetic flux which is directed towards the rotor axis, this flux can reach the rotor 1 practically without loss. The leakage flux, which has a path indicated by the dotted line 8, is negligibly small in practice, because the magnetic reluctance transverse to the axis $a$—$a$ of the flux generated, i. e., perpendicular to the plate laminations, is very large owing to the presence of the thin insulating layers between the individual plates. The favourable dimensioning of the armature 1 and of the air gap between the armature 1 and the stator 4, which is carried out according to generally known principles, further ensures that the flux enters the armature 1 without any appreciable further leakage losses, whereby the desired large motor torque is obtained. The leakage flux does not contribute towards the production of a large torque because it does not contribute to the magnetic energy in the air gap; consequently it must be kept small.

For a given constructional arrangement, the magnitude of the leakage flux is, as is known, also dependent upon the saturation of the magnetic core. By building up the iron core of the stator, between the stator winding and the rotor, of plates or plate assemblies arranged with their planes parallel to the rotor axis, the magnetic energy in the air gap can be made large in a comparatively simple manner due to the particular shaping of the stator plates and of the rotor and despite the comparatively low saturation in the stator plates.

Figure 2:
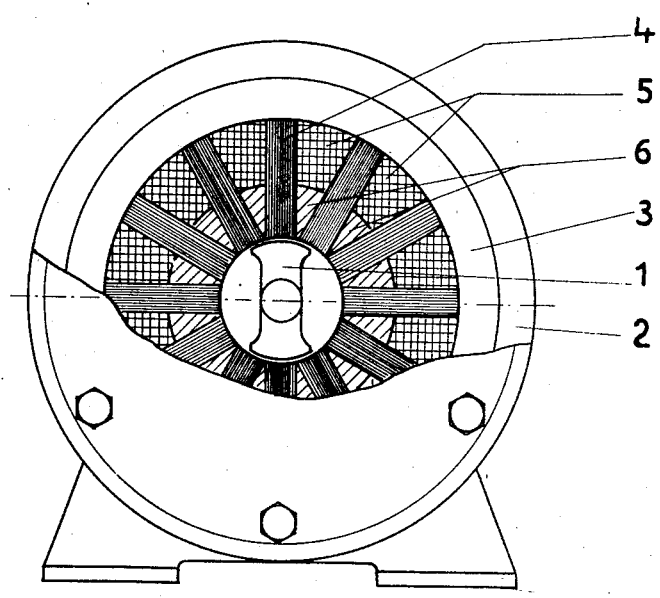
Figure 2 is a transverse section through the motor shown in Figure 1.

The rotor can be subdivided as shown in Figure 1, so that its total effective length is given as the sum of the thicknesses of the three discs $c$. The stator plates 4 may then be given the saw-like shape indicated in Figure 1, so that the individual teeth of the stator plates 4 come opposite a rotor part of width $c$. Because the total width $b$ of the stator plates 4 is considerably greater than the effective width for the flux path to the rotor 1 (in Figure 1, for example, it is equal to $3 \times c$), the saturation in the plates 4 when the teeth are directly opposite the rotor 1 can be kept smaller than in the teeth themselves. The result of this is that, despite the comparatively long iron path from the winding 5 to the rotor 1, the magnetic leakage remains comparatively small and, consequently, a comparatively large rotor torque can be produced with a minimum number of ampere turns on the stator.

Figure 5:
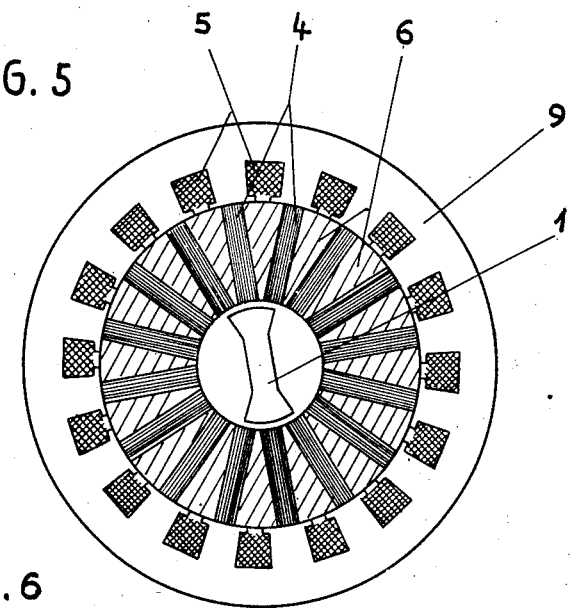
Figures 5 and 6 are transverse sections through motors having two modified forms of stator.

The shape of the stator yoke is of subordinate importance to the invention. Quite a conventional stator yoke 9 can be employed, such as, for example, that shown in Figure 5. In this construction my invention is directed particularly to the transfer parts interposed between this yoke 9 and the rotor 1, which transfer parts consist of plates 4 arranged in layers parallel to the rotor axis and clamped together to form assemblies or groups, insulation means 6 being disposed between the individual groups.

In principle, the groups of plates 4 here play the part of extended poles, such as are also used in motors the stators of which are constructed in the usual manner of plates which are arranged with their planes perpendicular to the rotor axis. The advantage of the construction according to the invention in the case of such motors with "extended poles" include those herein set forth, in addition to which must be added the fact that it is very difficult to wind a motor with "extended poles," whereas the winding of a motor according to the invention having plates arranged with their planes parallel to the rotor axis can always be effected in a comparatively simple manner, the windings being laid in the gaps between the individual groups of plates.

Figure 6:
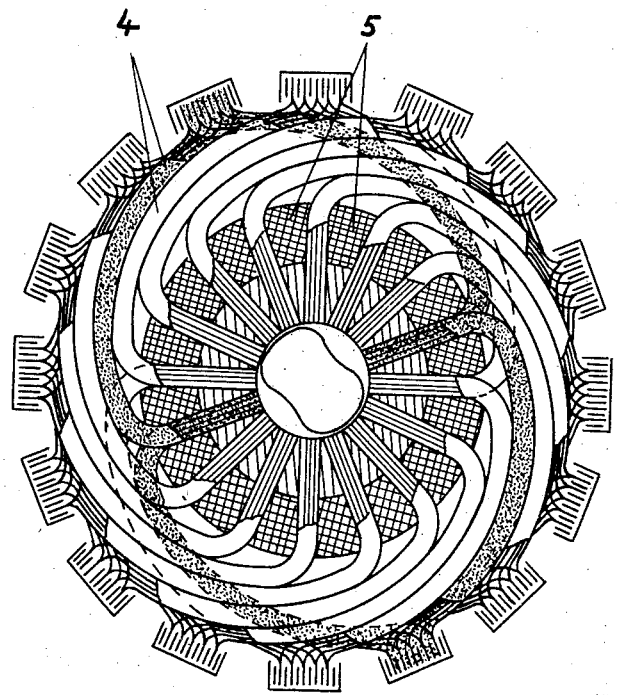
Figure 7:
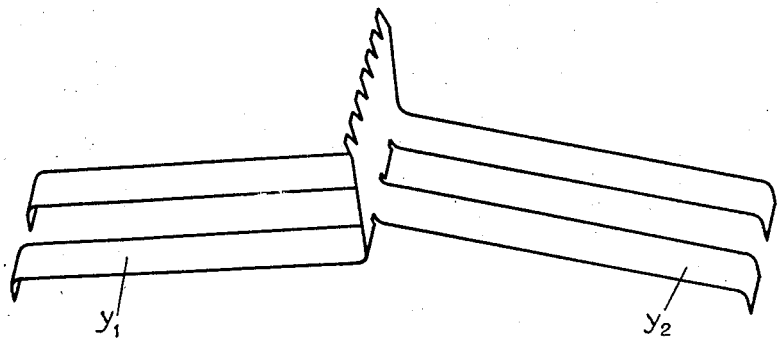
Fig. 7 shows a single stator plate as used in the motor shown in Fig. 6.
Figure 8:
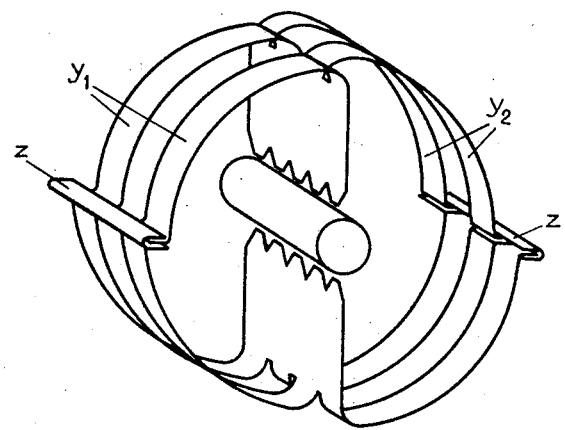
Fig. 8 illustrates the manner of connecting the plates shown in Fig. 7.

As shown in Figure 6, the individual plates or groups of plates 4, arranged with their planes parallel to the rotor axis, can also be bent over above the winding 5 to form a magnetically closed yoke. In this case, the stator plates are conveniently slotted in the radial direction and the plate lugs formed thereby are bent back in opposite directions, i. e., in a clockwise and in a counter-clockwise direction, for the purpose of forming the yoke. As shown in Figs. 7 and 8, the plates may also have more than one slot, in which case the lugs $y_1$ and $y_2$ are conveniently bent over alternately in a clockwise and counter-clockwise direction. The ends of the lugs of the plates or of the groups of plates, which lugs are bent over in opposite directions, are connected together magnetically at the periphery of the yoke by means of clamps $z$. In this way, each pair of plates or groups of plates thus connected together surrounds a pole division or an odd multiple of a pole division.

Obviously, it is also possible to make a stator of two or more equal parts, the stator plates being bent over for the purpose of forming the yoke but not being slotted. In this case the plates are simply bent over in a clockwise direction in one part and in a counter-clockwise direction in the other part. The magnetic connections of each pair of ends at the periphery of the yoke are, in this construction, effected in accordance with the same principles as with the stators having slotted plates.

Moreover, it is clear that the constructional examples described in this specification by way of example for the purpose of explaining the invention, do not exhaust all the constructional possibilities.

Those skilled in the art will appreciate that a number of further constructional forms can be devised without difficulty and without departing from the spirit and scope of the invention as set forth in the appended claims.

Having now particularly described and ascertained the nature of my said invention and in what manner the same is to be performed, I declare that what I claim is:

1. An electric motor having a stator supporting windings adapted to produce a rotating magnetic field and having an unwound rotor, the magnetic excitation of the latter being produced exclusively by said rotating magnetic field, the stator including plates or bundles of plates arranged in layers parallel to the axis of the rotor and disposed radially, the rotor being subdivided into discs in its longitudinal direction, and the ends of the stator plates or bundles of plates opposite the rotor being formed in the manner of saw teeth, a tooth of the stator plates being opposite a rotor disc and the outer ends of the stator plates or bundles of plates being provided with at least one radial slot, the lugs so formed being bent over alternately in opposite directions to form the yoke of the motor.

2. An electric motor having a stator supporting windings adapted to produce a rotating magnetic field and having an unwound rotor, the magnetic excitation of the latter being produced exclusively by said rotating magnetic field, the stator including plates or bundles of plates arranged in layers parallel to the axis of the rotor and disposed radially, the rotor being subdivided into discs in its longitudinal direction, and the ends of the stator plates or bundles of plates opposite the rotor being formed in the manner of saw teeth, a tooth of the stator plates being opposite a rotor disc and the outer ends of the stator plates or bundles of plates being provided with at least one radial slot, the lugs so formed being bent over alternately in opposite directions to form the yoke of the motor, and magnetic connections provided on the periphery of the yoke between the ends of the said lugs.

3. An electric motor having a stator supporting windings adapted to produce a rotating magnetic field and having an unwound rotor, the magnetic excitation of the latter being produced exclusively by said rotating magnetic field, the stator including plates or bundles of plates arranged in layers parallel to the axis of the rotor and disposed radially, the rotor being subdivided into discs in its longitudinal direction, and the ends of the stator plates or bundles of plates opposite the rotor being formed in the manner of saw teeth, a tooth of the stator plates being opposite a rotor disc and the outer ends of the stator plates or bundles of plates being provided with at least one radial slot, the lugs so formed being bent over alternately in opposite directions to form the yoke of the motor, and magnetic connections provided on the periphery of the yoke between the ends of the said lugs, the bent-over parts of each pair of magnetically interconnected plates or bundles of plates spanning over a pole pitch.

4. An electric motor having a stator supporting windings adapted to produce a rotating magnetic field and having an unwound rotor, the magnetic excitation of the latter being produced exclusively by said rotating magnetic field, the stator including plates or bundles of plates arranged in layers parallel to the axis of the rotor and disposed radially, the rotor being subdivided into discs in its longitudinal direction, and the ends of the stator plates or bundles of plates opposite the rotor being formed in the manner of saw teeth, a tooth of the stator plates being opposite a rotor disc and the outer ends of the stator plates or bundles of plates being provided with at least one radial slot, the lugs so formed being bent over alternately in opposite directions to form the yoke of the motor, and magnetic connections provided on the periphery of the yoke between the ends of the said lugs, the bent-over parts of each pair of magnetically interconnected plates or bundles of plates spanning over an odd number of pole pitches.

5. A synchronous reaction motor comprising a stator, windings supported in the stator and adapted to produce a rotating magnetic field, and a non-polarized rotor, the magnetic excitation of the latter being produced exclusively by the rotating magnetic field created in the stator, the stator including plates or bundles of plates arranged in layers parallel to the axis of the rotor and disposed radially, the rotor being subdivided into spaced discs in its axial direction, and the ends of the stator plates or bundles of plates opposite the rotor being formed in the manner of saw teeth, a tooth of the stator plates being opposite each rotor disc.

6. A synchronous reaction motor comprising a stator, including plates or bundles of plates arranged in layers parallel to the axis of the rotor, and disposed radially, stator windings supported wholly between the stator plates or bundles of plates, said windings producing a rotating magnetic field, and a non-polarized rotor, whose magnetic excitation is produced exclusively by the rotating magnetic field created in the stator, the rotor including a shaft and being subdivided into spaced discs in its axial direction, said discs being magnetically connected by way of the shaft, and the ends of the stator plates or bundles of plates opposite the rotor being formed in the manner of saw teeth, a tooth of the stator plates being opposite each rotor disc.

7. A synchronous reaction motor comprising a stator, including plates or bundles of plates arranged in layers parallel to the axis of the rotor, and disposed radially, stator windings supported wholly between the stator plates or bundles of plates, said windings producing a rotating magnetic field, and a non-polarized rotor, whose magnetic excitation is produced exclusively by the rotating magnetic field created in the stator, the rotor including a shaft and being subdivided into spaced discs in its axial direction, said discs being magnetically connected by way of the shaft, and the ends of the stator plates or bundles of plates opposite the rotor being formed in the manner of saw teeth, a tooth of the stator plates being opposite each rotor disc, the discs being of elongate form in their radial planes, and each presenting a magnetic path of maximum conductivity between a stator tooth and a diametrically opposite stator tooth.

8. A motor as defined in claim 7, wherein the rotor discs are arranged in axial alignment on the shaft.

FRIEDRICH ERNST FISCHER.